Oct. 11, 1927.

J. R. C. AUGUST 1,645,367

OPTICAL PROJECTION SYSTEM

Filed April 6, 1926

Inventor.
Johannes Robert Carl August,
By Sturtevant & Mason,
Attorneys.

Patented Oct. 11, 1927.

1,645,367

UNITED STATES PATENT OFFICE.

JOHANNES ROBERT CARL AUGUST, OF LONDON, ENGLAND.

OPTICAL PROJECTION SYSTEM.

Application filed April 6, 1926, Serial No. 100,114, and in Great Britain December 4, 1925.

The present invention relates to an improved optical projection system suitable for the enlarging or reducing of images as desired.

According to the present invention a novel mechanism is provided for the projection of an image of any desired size of enlargement or reduction upon a screen or upon a light sensitive surface in the making of enlargements from a negative or in the manufacture of reduced size reproductions, such for instance, as in the making of lantern slides from larger pictures.

Various optical systems have been suggested in which two of the three elements are movable and are displaced by Archimedean spirals of different pitch on a shaft parallel with the optical axis. It will be seen on a critical examination of these systems that either enlargements of the object or alternatively reduction of the object are possible, but not both on one and the same machine. Arrangements are however known as for instance in the previous patent application in the United States Ser. No. 76,288, filed on Dec. 18, 1925 by Edgar Kenneth Hunter, to control the displacement of the two movable elements by a pair of cams which allow the two movable elements to move at differing rates first both towards the fixed object as the scale of reproduction is altered and then to allow one of the elements to continue its progressive movement whilst the other element has the direction of its movement reversed.

According to the present invention an element displaceable at right angles to the optical axis has a pair of cam surfaces upon it and a third cam surface which lies at a slight angle to the normal to the optical axis, this element may be a cylinder cut with three cams and further be freely displaceable parallel to the optical axis.

The distances between the operative points on the three cam surfaces follow the Newtonian law of conjugate foci.

The invention is more particularly described with reference to the accompanying diagrammatic drawings in which:—

Figure 1:
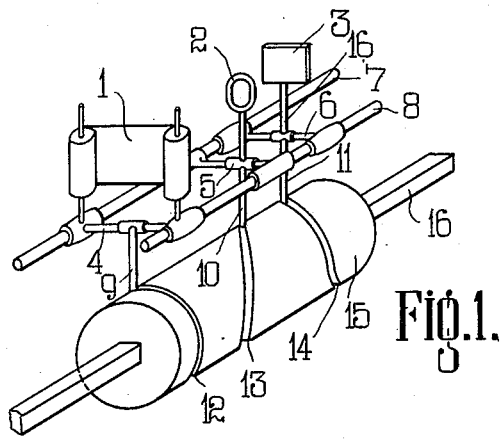
Figure 1 is a diagrammatic view in perspective of an arrangement according to the present invention.
Figure 2:
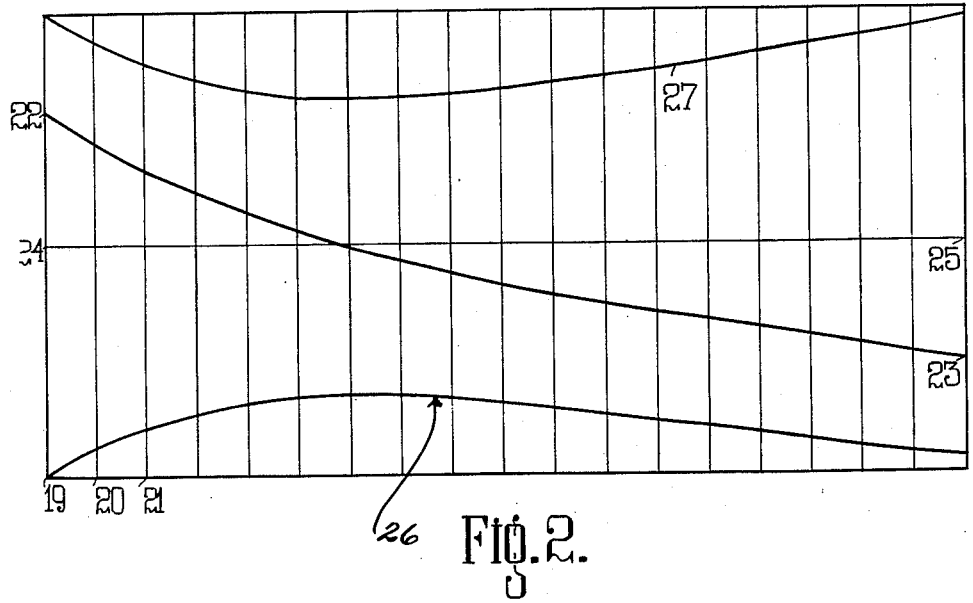
Figure 2 is a development of the controlling cam.

A beam from a source of light suitably disposed, projects a beam through a partially translucent object 1 to be projected by means of the lens 2 on an enlarged, or alternatively upon a reduced scale, as an image upon a screen or receptive surface 3 on a carrier 6. The parts 1, 2 and 3 may be connected by telescopic bellows or otherwise. These parts 1, 2 and 3 are guided parallel to the optical axis in that each is mounted upon a carrier 4, 5, 6 respectively guided upon rods 7, 8 parallel to the optical axis. Each carrier 4, 5, 6 has a pin 9, 10, 11 respectively, which engage with cam grooves 12, 13, 14 respectively in a drum 15 freely slidable axially of the optical axis along a guide bar 16.

The cams 12, 13 and 14 are so disposed that by turning the guide bar 16 about its axis, that is to say, about an axis parallel with the optical axis, the lens 2 will be displaced from a position adjacent the receptive surface 3 progressively towards and up to a position adjacent to the object 1, the image of which has to be projected upon the receptive surface 3.

The cams 12, 13 and 14, are so displaced that the three elements 1, 2 and 3 always maintain a relationship following the Newtonian law of conjugate foci, so that the projected image upon the receptive surface 3 is always in focus whatever the ratio of enlargement or reduction.

The image carrier 4 may be fixed; the other two carriers will always automatically take up a position whereby the image upon the receptive surface 3 is in sharp focus.

The inclination of the cam surfaces will be so chosen relatively to the axis of the drum 15 that the pins 9, 10, 11 will contact with them at an angle greater than the angle of friction. That is to say, the angle subtended by the line 22—23, relatively to the normal axis 24, 25 to the cylinder can obviously be made as obtuse as necessary to achieve this end, the complementary curves 26, 27 being then plotted accordingly.

I declare that what I claim is:—

1. An optical projection system for the enlargement or reduction of images comprising an object carrier, a lens carrier, an image carrier, an element having three cam surfaces thereon, pins on said carriers engaging said cams, and means to displace the said element relatively to said pins whilst maintaining their mutual relationship according to the Newtonian law of conjugate foci.

2. An optical projection system for the enlargement or reduction of images comprising an object carrier, a lens carrier, an image carrier, a rotatable drum having three cam surfaces thereon, pins on said carriers engaging said cams, and means to displace the said element relatively to said pins whilst maintaining their mutual relationship according to the Newtonian law of conjugate foci.

3. An optical projection system for the enlargement or reduction of images comprising an object carrier, a lens carrier, an image carrier, an element having three cam surfaces thereon, pins on said carriers engaging said cams, a shaft parallel with the optical axis on which said drum is axially slidable, and means to rotate the said shaft to cause the displacement of the carriers relatively to one another whilst maintaining constant their mutual relationship according to the Newtonian law of conjugate foci.

4. An optical projection system for the enlargement or reduction of images comprising an object carrier, a lens carrier, an image carrier, an element having two cam surfaces thereon similar but reversed, and a third cam surface at an angle to the optical axis, pins on said carriers engaging said three cams respectively, and means to displace the said element relatively to said pins whilst maintaining their mutual relationship according to the Newtonian law of conjugate foci.

In witness whereof, I have hereunto signed my name this 25th day of March, 1926.

JOHANNES ROBERT CARL AUGUST.